US012697879B2

(12) United States Patent
Diboine et al.

(10) Patent No.: US 12,697,879 B2
(45) Date of Patent: Aug. 4, 2026

(54) DISPLAY DEVICE FOR VEHICLE

(71) Applicant: LG ELECTRONICS INC., Seoul (KR)

(72) Inventors: Romain Diboine, Seoul (KR); Hansoo Kim, Seoul (KR); Byunglok Jeon, Seoul (KR); Inkoo Shim, Seoul (KR); Byungkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/844,824

(22) PCT Filed: Mar. 8, 2022

(86) PCT No.: PCT/KR2022/003250
§ 371 (c)(1),
(2) Date: Sep. 6, 2024

(87) PCT Pub. No.: WO2023/171829
PCT Pub. Date: Sep. 14, 2023

(65) Prior Publication Data
US 2025/0187438 A1 Jun. 12, 2025

(51) Int. Cl.
| | |
|---|---|
| *B60K 35/53* | (2024.01) |
| *B60K 35/10* | (2024.01) |
| *B60K 35/22* | (2024.01) |
| *B60K 35/23* | (2024.01) |
| *B60K 35/29* | (2024.01) |

(Continued)

(52) U.S. Cl.
CPC .............. *B60K 35/53* (2024.01); *B60K 35/10* (2024.01); *B60K 35/22* (2024.01); *B60K 35/23* (2024.01); *B60K 35/29* (2024.01); *B60K 35/60* (2024.01); *B60K 35/80* (2024.01); *B60K 35/90* (2024.01); *B60R 11/0235* (2013.01); *B60K 2360/48* (2024.01); *B60K 2360/816* (2024.01); *B60R 2011/0085* (2013.01); *B60R 2011/0092* (2013.01)

(58) Field of Classification Search
None
See application file for complete search history.

(56) References Cited

U.S. PATENT DOCUMENTS

| | | | | |
|---|---|---|---|---|
| 11,072,311 B2 * | 7/2021 | Luchner | .................... | G07C 9/25 |
| 11,220,182 B1 * | 1/2022 | Fisker | .................... | B60K 35/10 |

(Continued)

FOREIGN PATENT DOCUMENTS

| | | |
|---|---|---|
| DE | 10 2017 213 921 A1 | 2/2019 |
| EP | 3 943 323 A1 | 1/2022 |

(Continued)

*Primary Examiner* — Chikaodili E Anyikire
(74) *Attorney, Agent, or Firm* — Birch, Stewart, Kolasch & Birch, LLP

(57) ABSTRACT

Disclosed is a display device for a vehicle. The display device for a vehicle comprises: a housing which is elongated and provides a receiving space therein; a first display fixed to the outside of the housing; a second display adjacent to the first display outside the housing and rotatably coupled to the housing; and a driving module installed in the receiving space of the housing and connected to the second display to rotate the second display, wherein, while the second display is rotated, a portion of the second display may overlap the first display.

8 Claims, 16 Drawing Sheets

(51) Int. Cl.

| | | |
|---|---|---|
| *B60K 35/60* | (2024.01) | |
| *B60K 35/80* | (2024.01) | |
| *B60K 35/90* | (2024.01) | |
| *B60R 11/02* | (2006.01) | |
| *B60R 11/00* | (2006.01) | |

(56) References Cited

U.S. PATENT DOCUMENTS

| | | | |
|---|---|---|---|
| 2006/0286944 A1* | 12/2006 | Songwe | B60K 37/20 |
| | | | 455/99 |
| 2013/0147847 A1* | 6/2013 | Koseki | B60R 11/0235 |
| | | | 345/660 |
| 2014/0368097 A1* | 12/2014 | Yomogita | G02B 27/0149 |
| | | | 312/23 |
| 2018/0011551 A1* | 1/2018 | Gothlin | G06F 3/0346 |
| 2019/0071055 A1 | 3/2019 | Luchner et al. | |
| 2020/0238826 A1* | 7/2020 | Mizobata | B60K 35/215 |

FOREIGN PATENT DOCUMENTS

| | | | |
|---|---|---|---|
| FR | 3 068 307 A1 | 1/2019 | |
| JP | 2013-154722 A | 8/2013 | |

* cited by examiner

DISPLAY DEVICE FOR VEHICLE

CROSS REFERENCE TO RELATED APPLICATIONS

This application is the National Phase of PCT International Application No. PCT/KR2022/003250, filed on Mar. 8, 2022, which is hereby expressly incorporated by reference into the present application.

TECHNICAL FIELD

The present disclosure relates to a display device for a vehicle.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used. A display device using an organic light emitting diode (OLED) has excellent luminance and viewing angle characteristics compared to a liquid crystal display device, and requires no backlight unit, which is advantageous to achieve an ultra-thin profile.

A vehicle is a means of transportation, which is manually driven by a human driver. Information regarding the state or status of a vehicle is necessary for a driver to operate the vehicle, and the vehicle's status information can be delivered to the driver through an analog display device or a digital display in the vehicle. With the advancement of vehicle functions and performance, more information can be provided to drivers than ever before, and research is being conducted on displays to provide safe and space-efficient information due to the structural constraints of vehicles in terms of passenger safety and space limitation.

Autonomous or self-driving vehicles capable of moving without the intervention of a human driver have been under development for years. A driver or passenger in an autonomous vehicle can be provided with not only information necessary for the operation of the vehicle, but also work or convenience-related information. In-vehicle infotainment (IVI) is a system in which devices installed in a vehicle provides driving-related information, such as the vehicle status and navigation, as well as entertainment for users. In-car entertainment (ICE) refers to a system in cars that provides multimedia content for users.

Recently, numerous research has been conducted on such an in-vehicle display device.

DISCLOSURE

Technical Problem

It is an objective of the present disclosure to solve the above and other problems.

It is another objective of the present disclosure to provide a variable display device for a vehicle.

It is yet another objective of the present disclosure to provide a display device for a vehicle equipped with a variable mechanism.

Technical Solution

According to an aspect of the subject matter described in this application, a display device for a vehicle includes: a housing that defines an accommodation space therein; a first display fixed to an outside of the housing; a second display positioned adjacent to the first display at the outside of the housing, the second display being rotatably coupled to the housing; and a driving module installed in the accommodation space of the housing, the driving module being connected to the second display to cause the second display to rotate, wherein a portion of the second display overlaps the first display as the second display rotates.

Advantageous Effects

A display device for a vehicle according to the present disclosure has the following effects.

According to at least one of the embodiments of the present disclosure, it is possible to provide a variable display device for a vehicle.

According to at least one of the embodiments of the present disclosure, it is possible to provide a display device for a vehicle equipped with a variable mechanism.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

MODE FOR THE INVENTION

Figure 1:
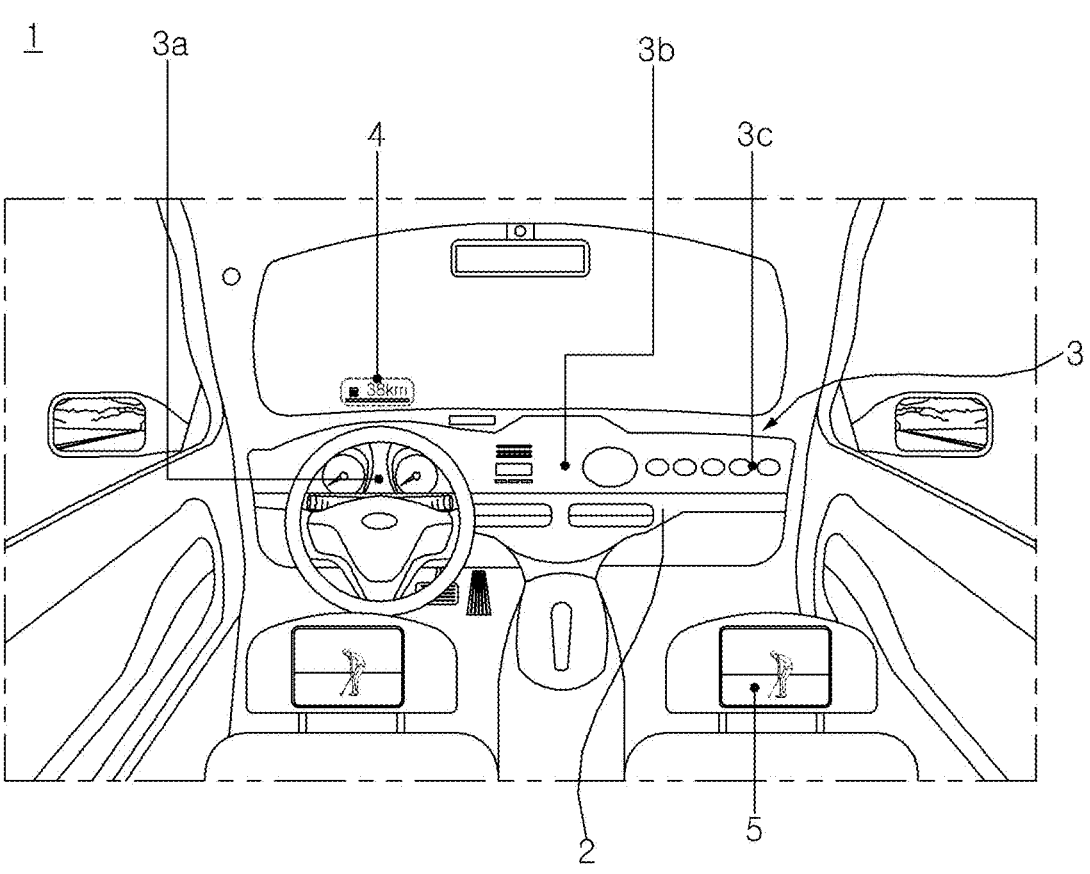
FIGS. 1 to 16 illustrate examples of a display device for a vehicle according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

In the following description, when an embodiment is described with reference to a specific figure, reference numeral not shown in the specific figure may be mentioned, if necessary or desired. However, the reference numeral not shown in the specific figure may be mentioned only when the reference numeral is shown in other figures.

Referring to FIG. 1, a display device may be installed in a cabin 1 of a vehicle. The display device may be referred to as an in-vehicle digital cockpit. A plurality of display devices may be installed in the cabin 1 of the vehicle.

A main display device 3 may be installed on a dashboard 2 of the vehicle. The main display device 3 may include a cluster 3a, a center information display (CID) 3b, and a co-driver display (CDD) 3c. The cluster 3a may provide information to a driver, the CDD 3c may provide information to a front seat passenger, and the CID 3b may provide information to an occupant.

A head-up display (HUD) 4 may be installed on the dashboard 2 to display information on a front windshield of the vehicle. The HUD 4 may provide information to the driver while the driver keeps his or her eyes on the road ahead.

A rear seat entertainment (RSE) 5 may be mounted on the rear of a driver's seat headrest and/or the rear of a passenger seat's headrest. The RSE 5 may provide information to a rear seat passenger.

Figure 2:
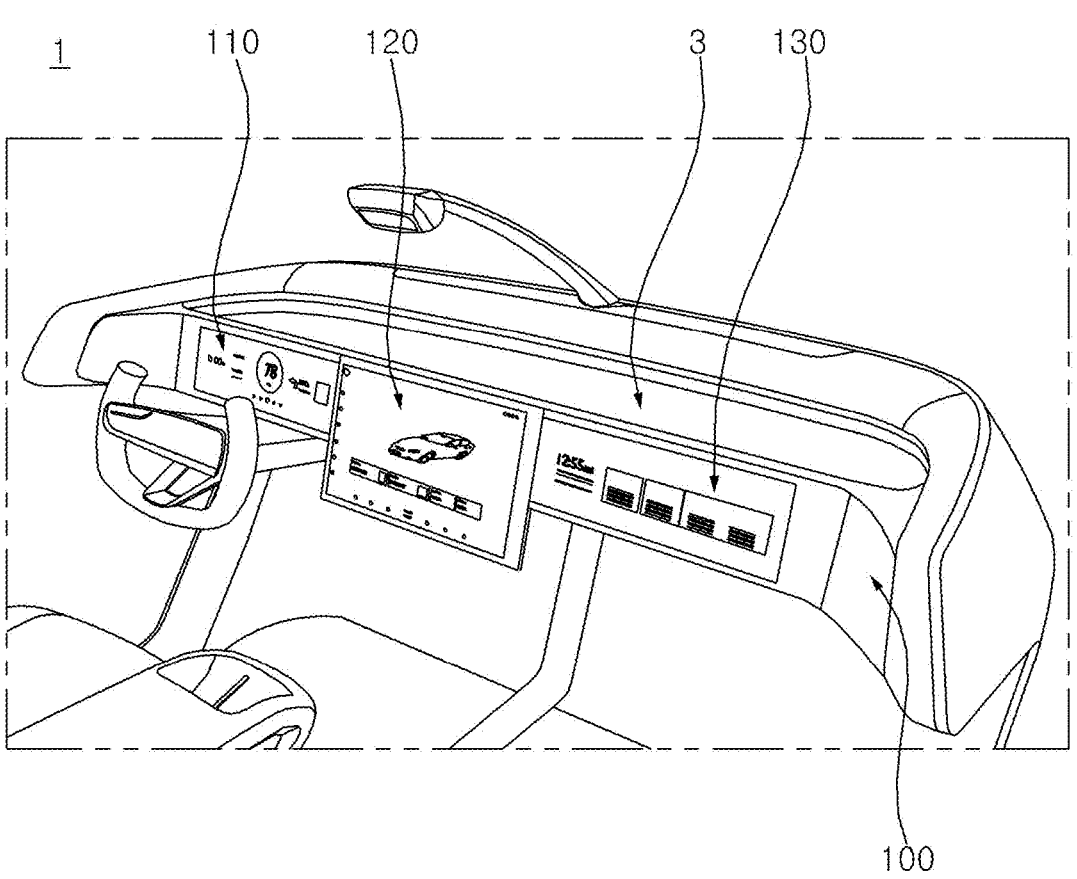
Figure 3:
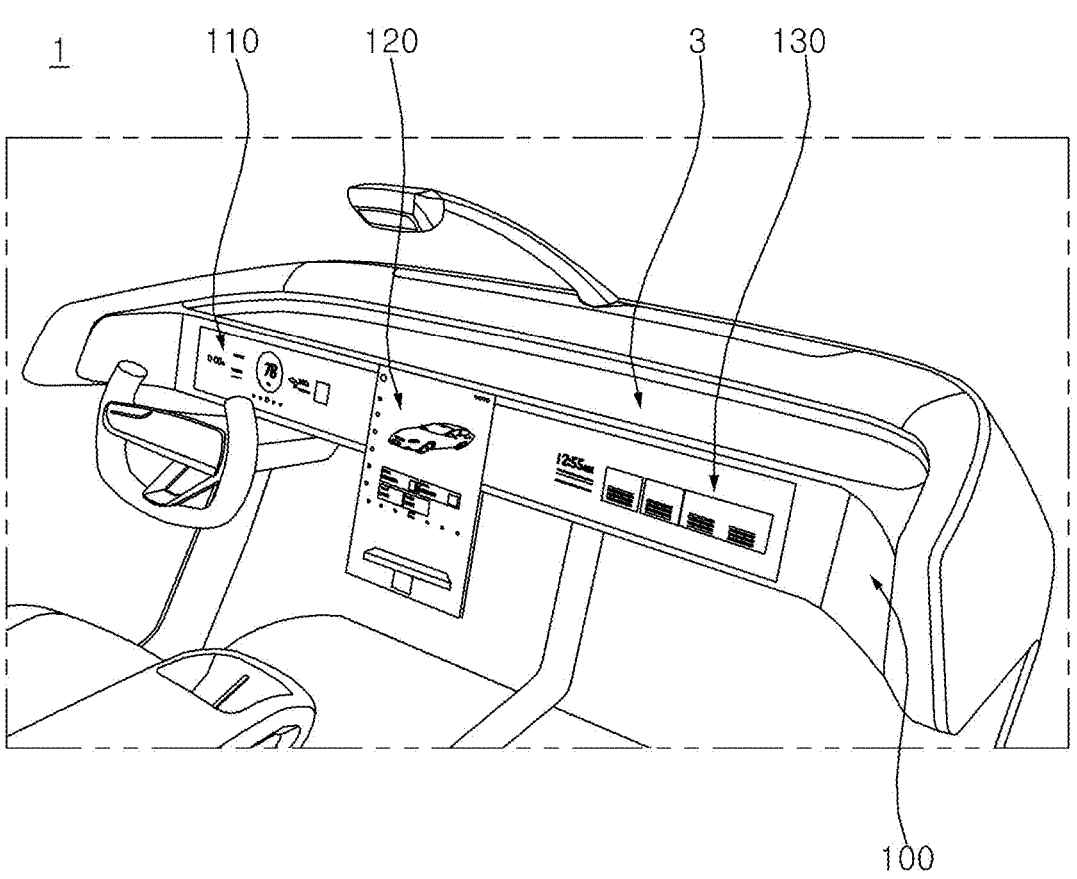

Referring to FIGS. 2 and 3, a display device 100 may be installed in the cabin 1. The display device 100 may be referred to as a display device 100 for vehicle. The display device 100 may be mounted on a dashboard 3. There may be a plurality of display devices 100. The plurality of display devices 100 may include a first display 110, a second display 120, and a third display 130.

The first display 110 may be placed in front of the driver's seat, the third display 130 may be placed in front of the passenger's seat, and the second display 120 may be placed between the first display 110 and the third display 130. For example, the first display 110 may be a cluster, the second display 120 may be a CID, and the third display 130 may be a CDD.

The second display 120 may be rotatable. The second display 120 may be switched from a landscape mode (first mode) (see FIG. 2) to a portrait mode (second mode) (see FIG. 3). As the second display 120 rotates, information displayed on the second display 120 may be rearranged. As the second display 120 rotates, information displayed on the first display 110 and/or the third display 130 may be expanded. For example, when the second display 120 is in the first mode, a hidden area where the first display 110 and/or the third display 130 overlaps the second display 120 may be deactivated. As another example, when the second display 120 is in the second mode, the hidden area of the first display 110 and/or the third display 130 may be activated.

Figure 4:
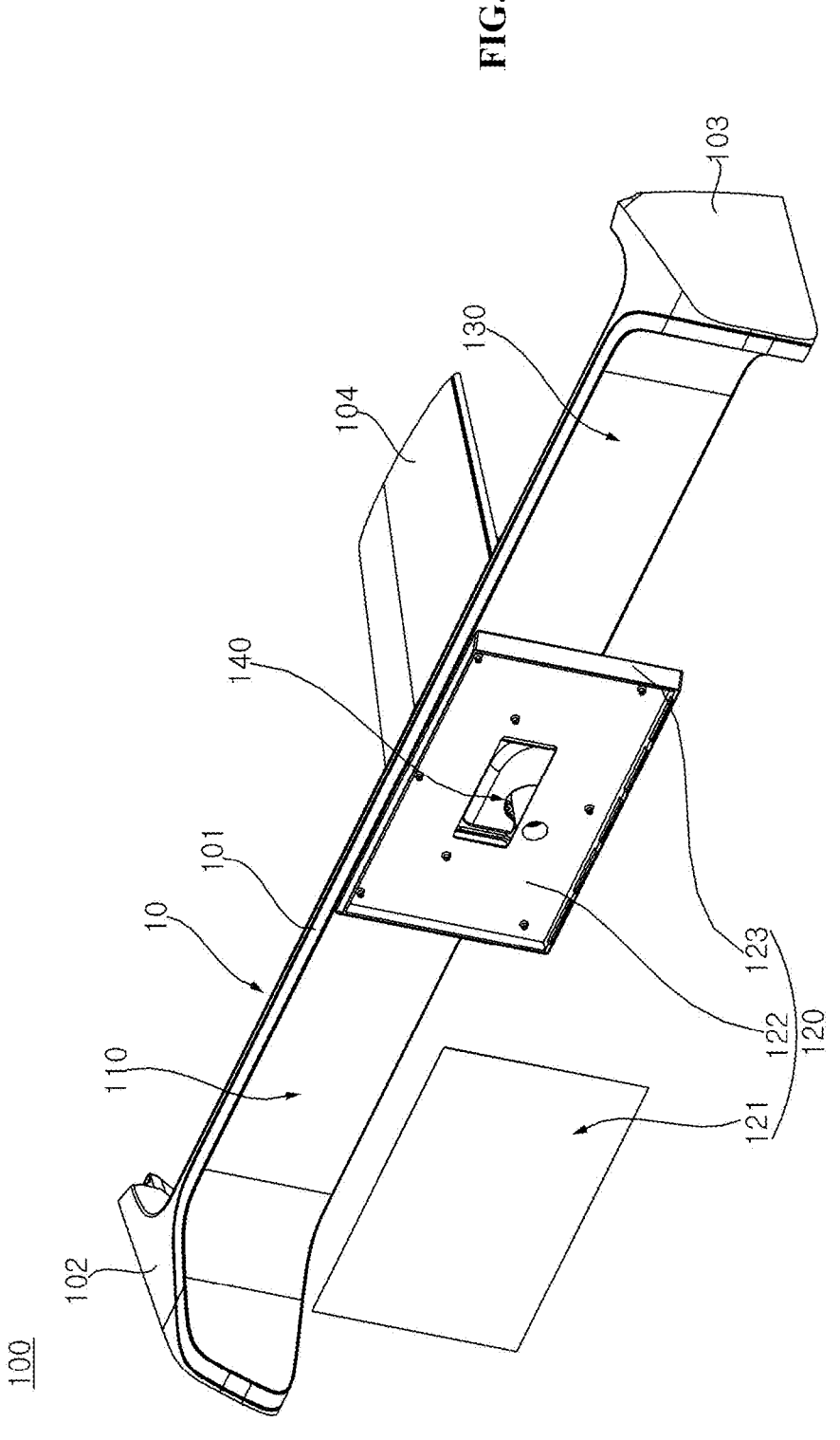
Figure 5:
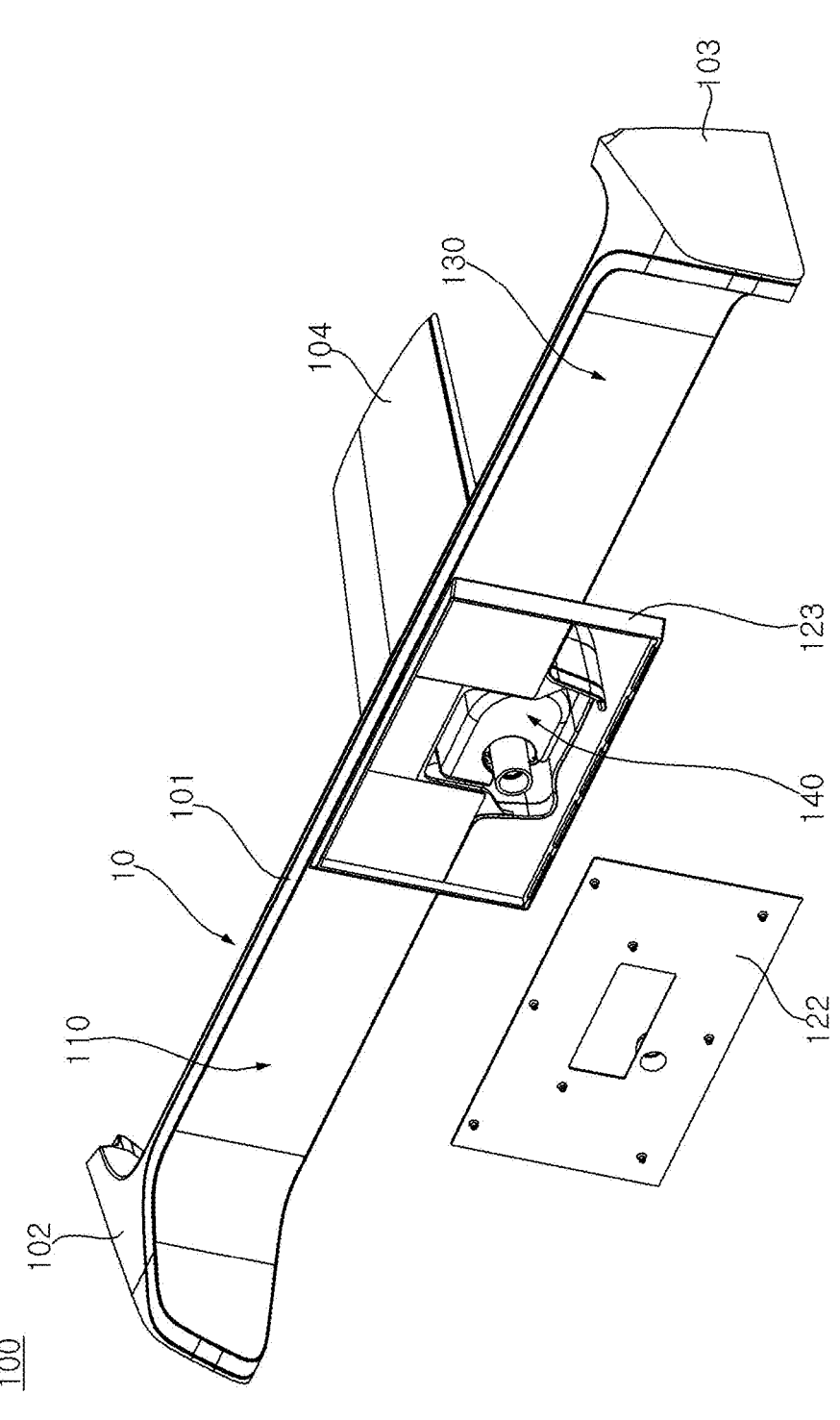

Referring to FIGS. 4 and 5, a housing 10 may include a center part 101, wing parts 102 and 103, and a rear part 104. The center part 101 may have the shape of a plate elongated horizontally, and the wing parts 102 and 103 may be bent and extend from opposite ends of the center part 101 to thereby form side wings. A first wing part 102 may be formed on the left side of the center part 101, and the second wing part 103 may be formed on the right side of the center part 101. The rear part 104 may be elongated from the center part 101 in a direction intersecting a longitudinal direction of the center part 101. The first wing part 102 may be disposed opposite the second wing part 103 with respect to the rear part 104.

The first display 110 may be positioned between the first wing part 102 and the second display 120, and may be fixed to the front of the center part 101 of the housing 10. A width of the first display 110 may correspond to a width of the center part 101 of the housing 10.

The third display 130 may be positioned between the second wing part 103 and the second display 120, and may be fixed to the front of the center part 101 of the housing 10. A width of the third display 130 may correspond to the width of the center part 101 of the housing 10.

The second display 120 may include a display panel 121, a frame 123, and a rear plate 122. A size of the rear plate 122 may correspond to a size of the display panel 121. The rear plate 122 may face the display panel 121. The frame 123 may be coupled to the rear plate 122. The display panel 121 may be coupled to the frame 123 and the rear plate 122.

The rear part 104 of the housing 10 may have an accommodation (or receiving) space therein. The accommodation space of the rear part 104 may be exposed to the outside through an opening of the center part 101 of the housing 10. A driving module 140 may be disposed in the accommodation space of the rear part 104.

The second display 120 may be connected to the driving module 140. The driving module 140 may cause the second display 120 to rotate. The second display 120 may be referred to as a center display 120.

Figure 6:
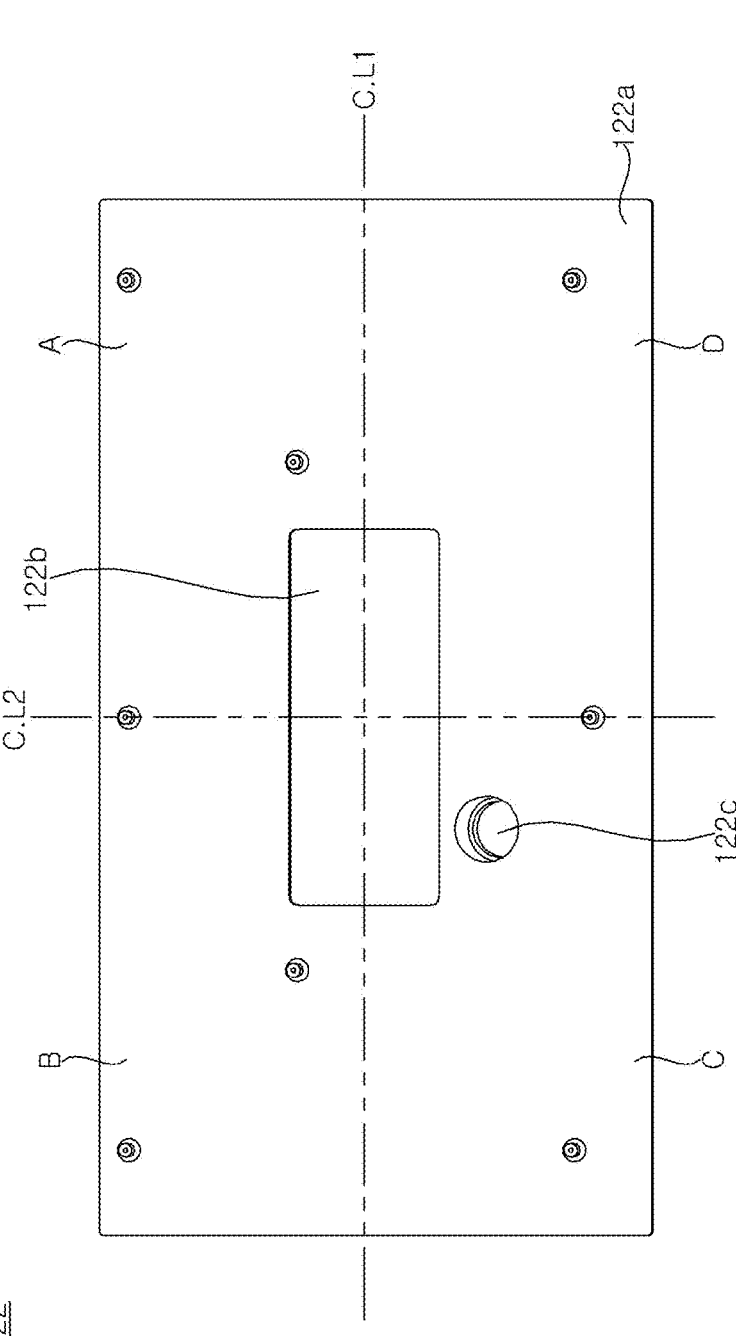
Figure 7:
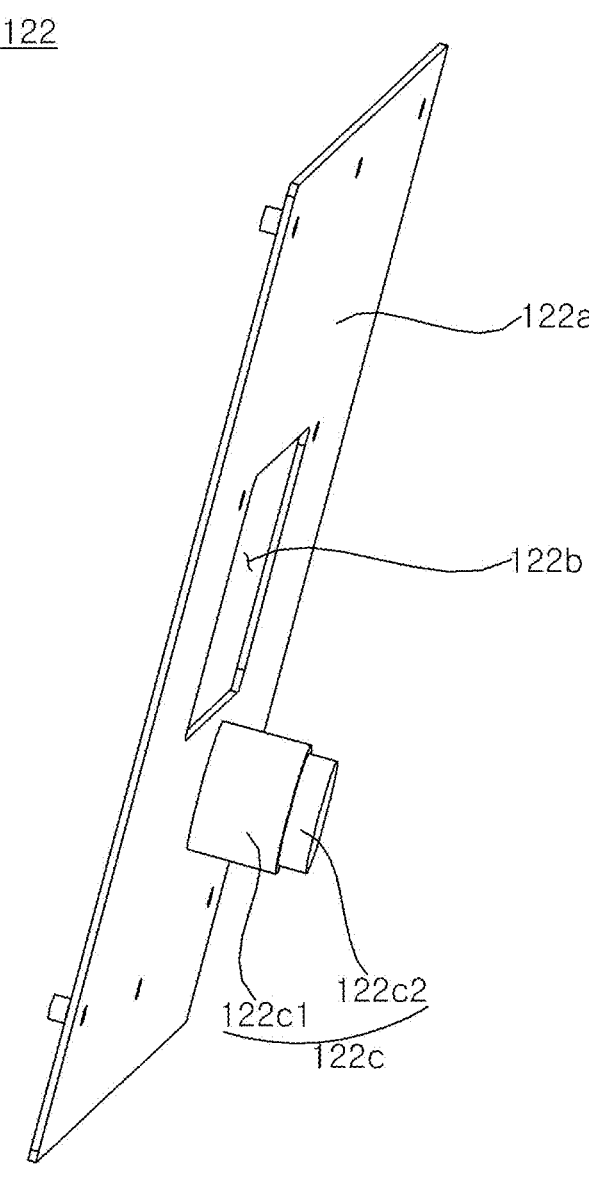
Figure 8:
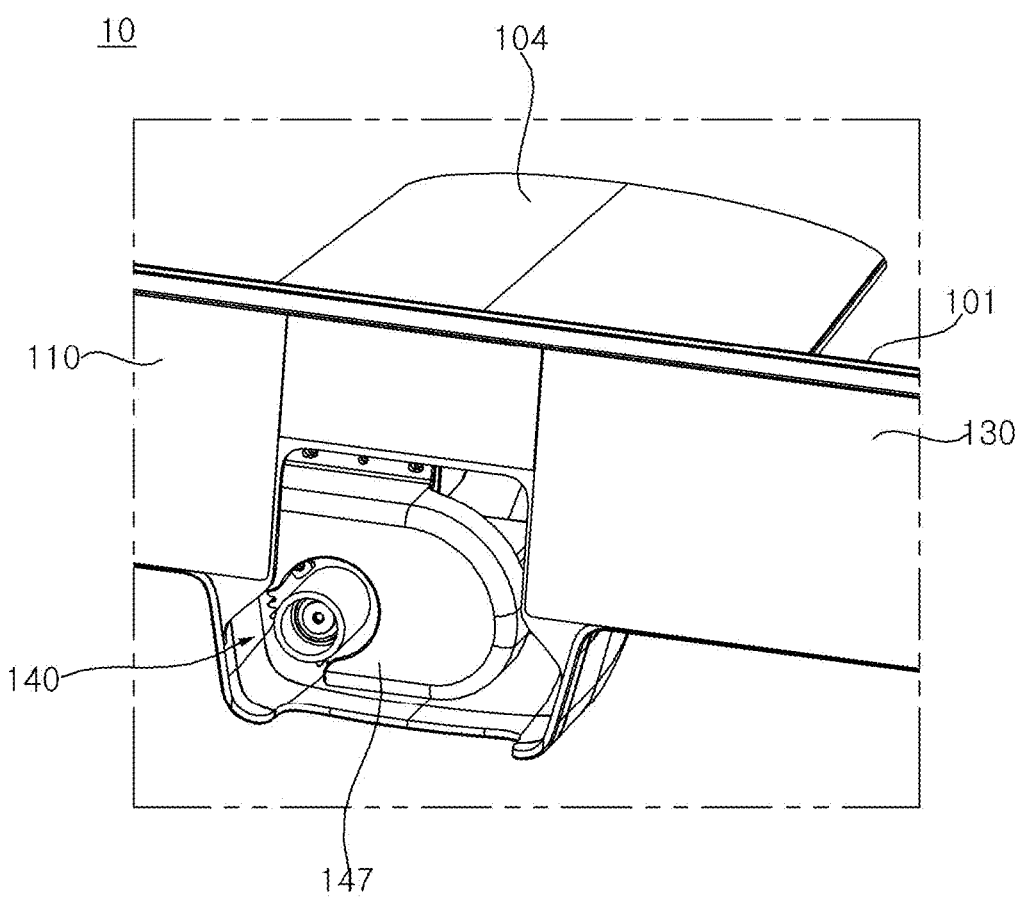
Figure 9:
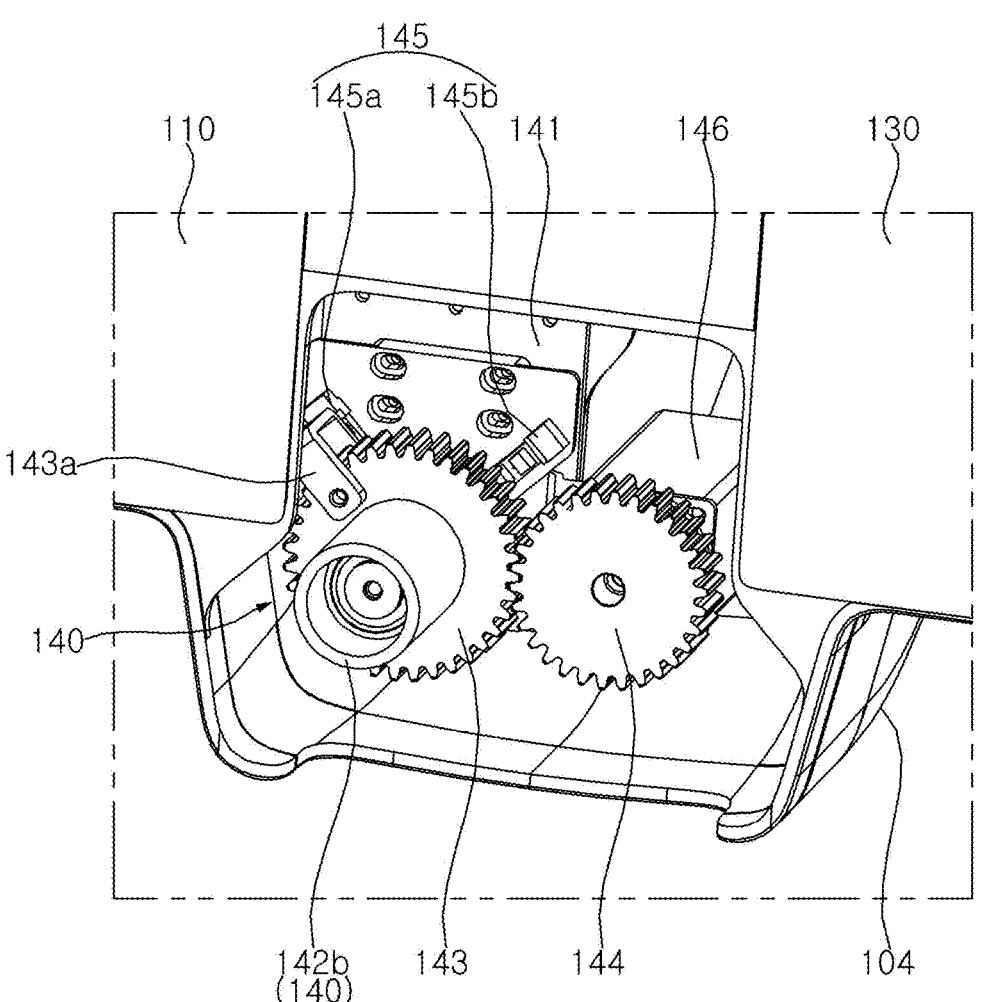
Figure 10:
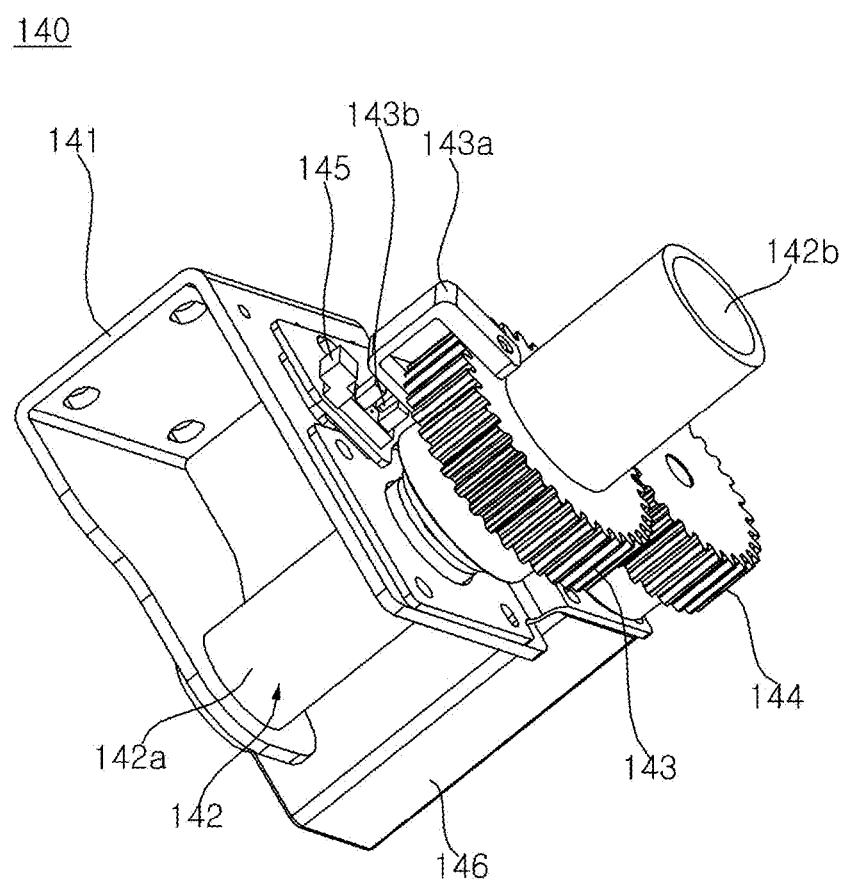
Figure 11:
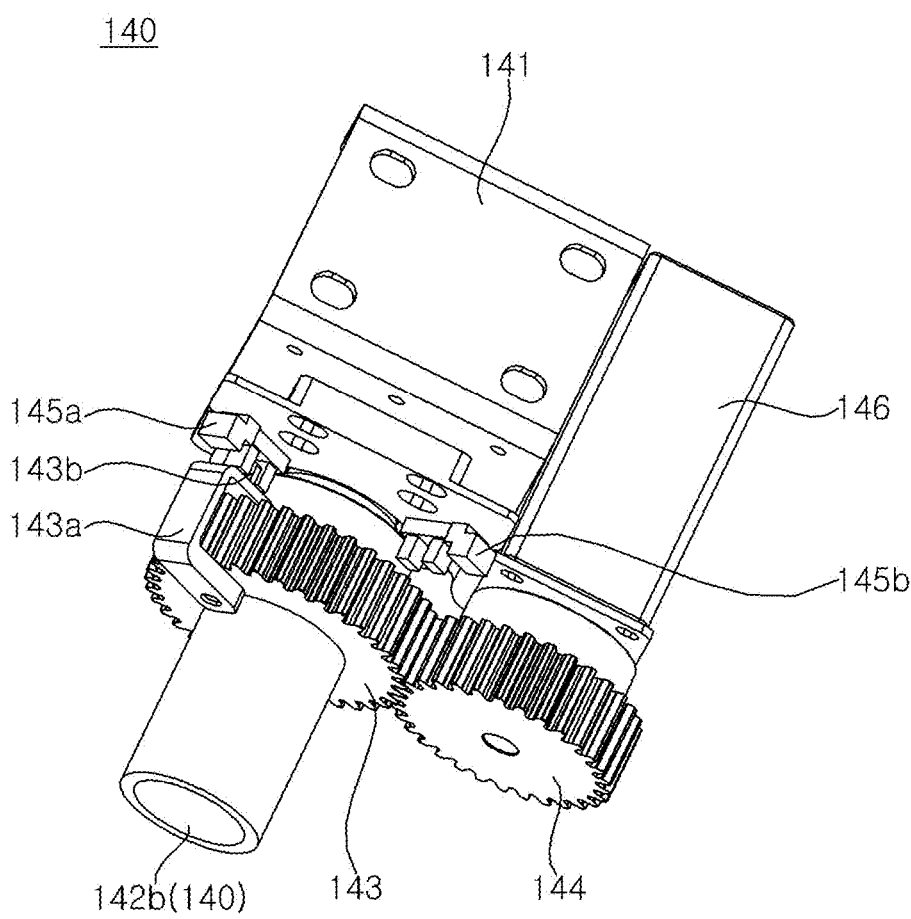
Figure 12:
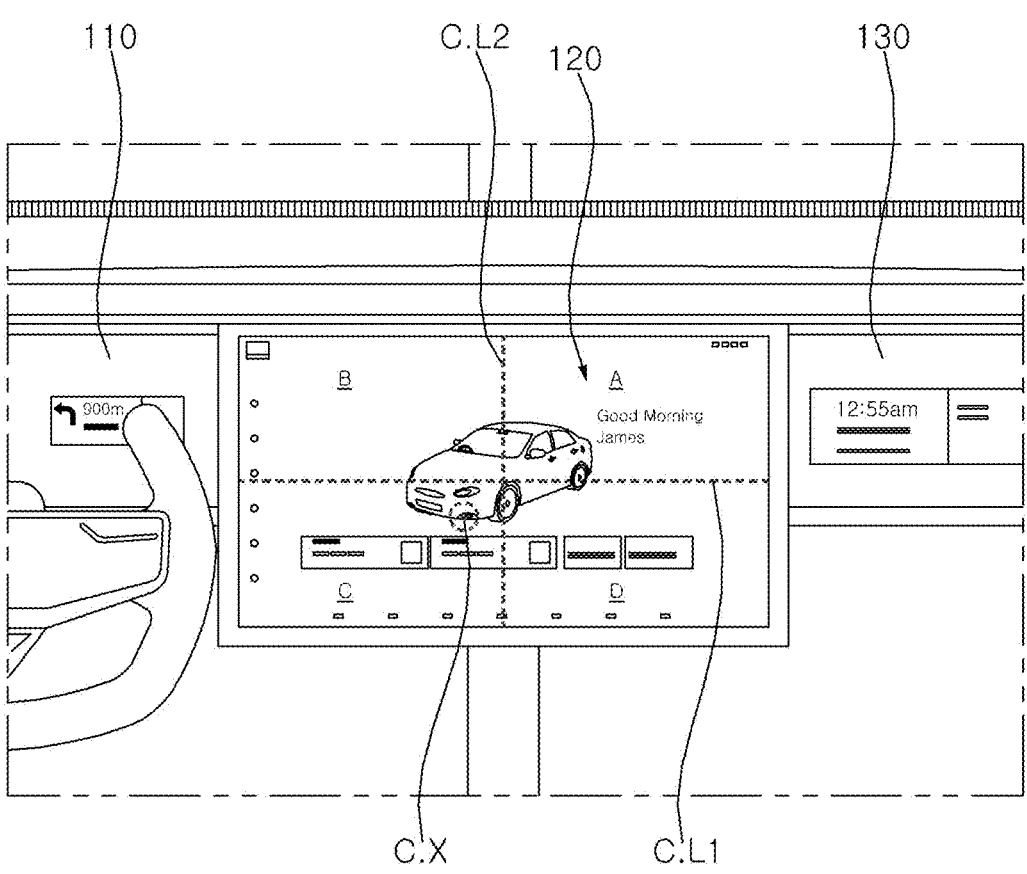
Figure 13:
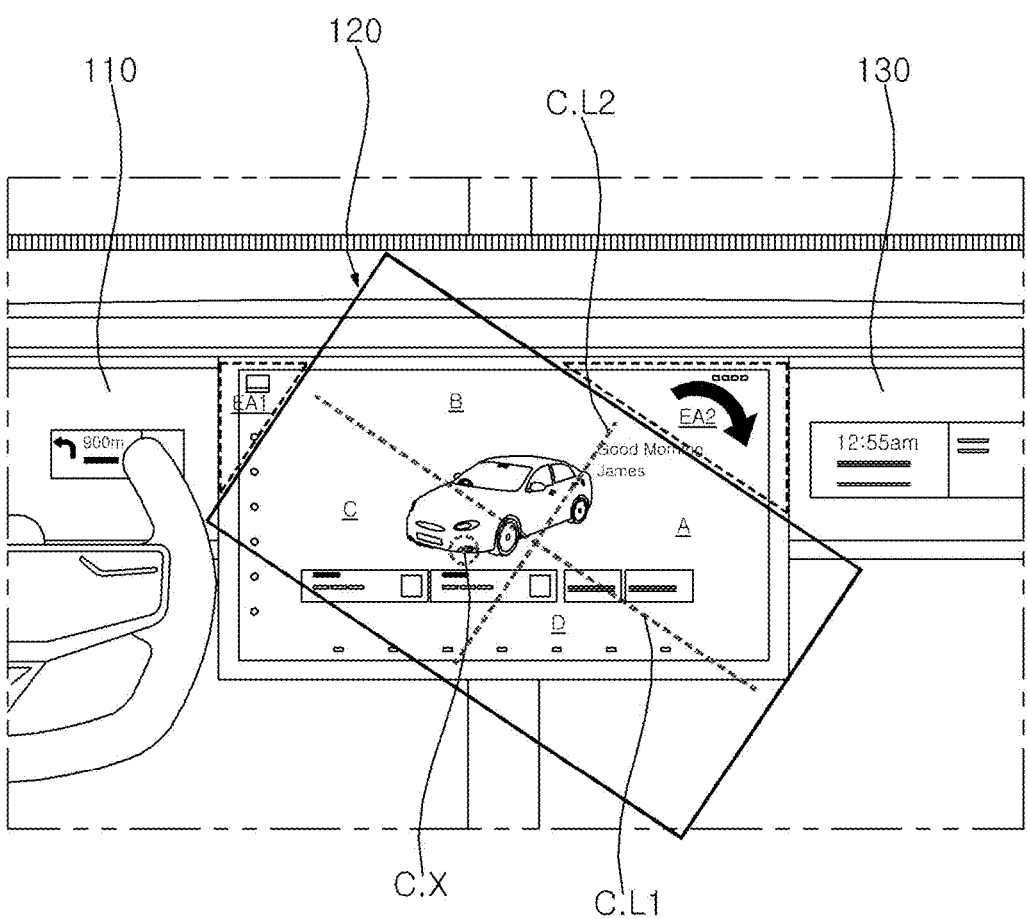
Figure 14:
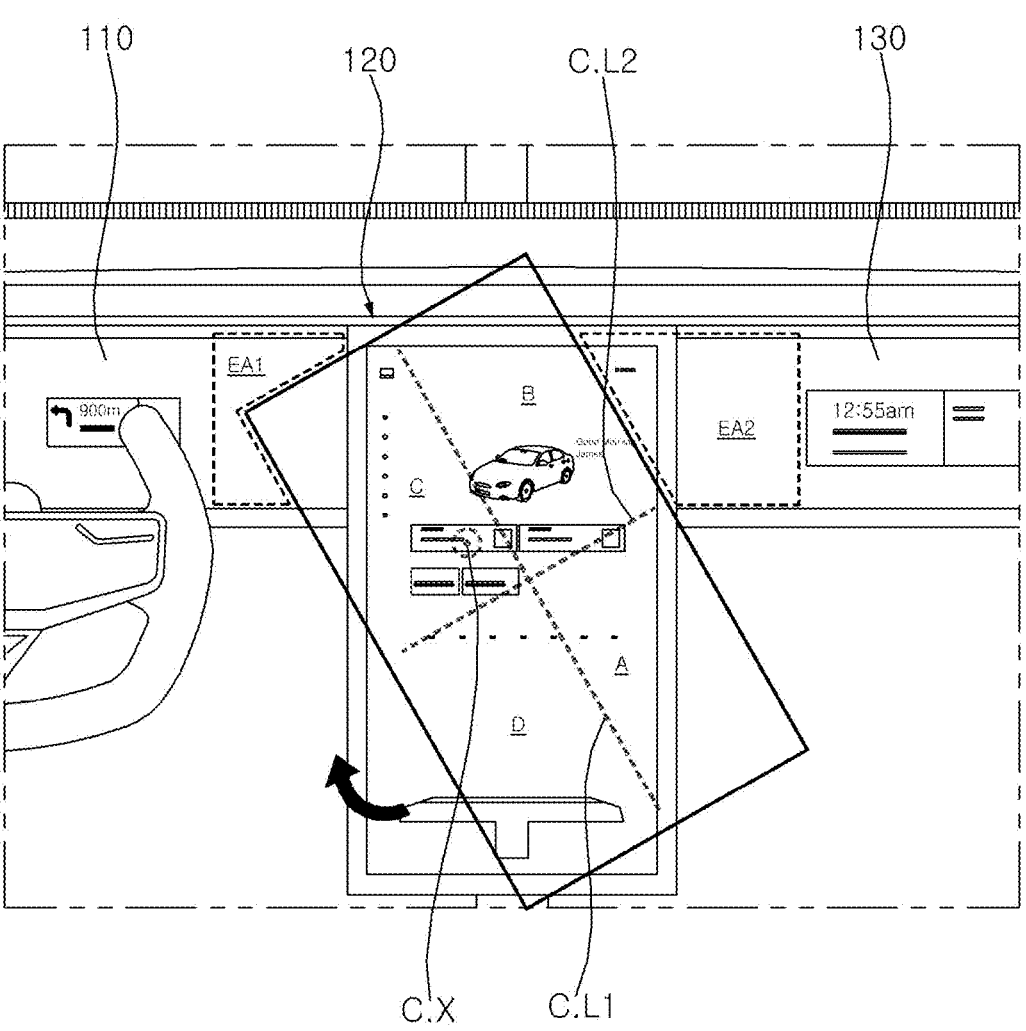
Figure 15:
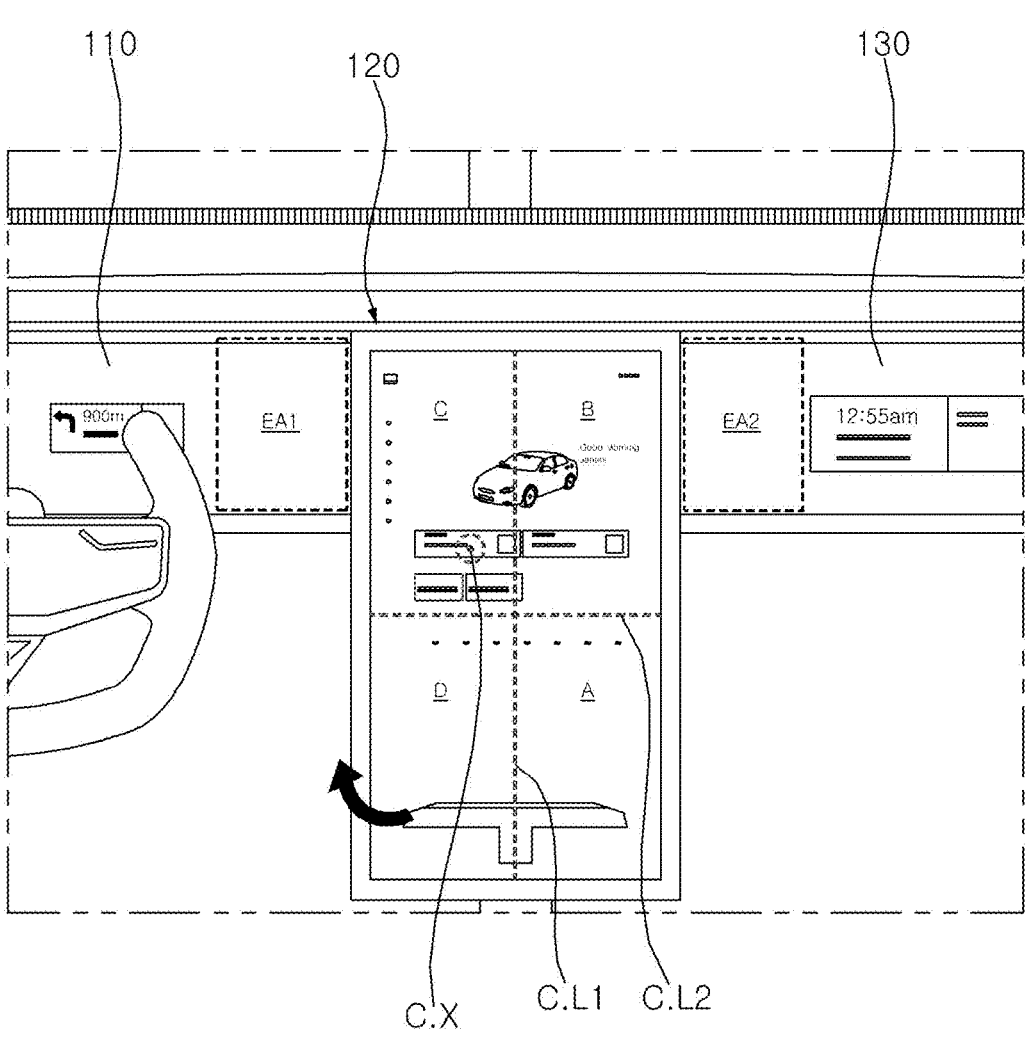

Referring to FIGS. 6 and 7, the rear plate 122 may include a flat part 122a and a rotating shaft 122c. The flat part 122a may have a rectangular shape. The flat part 122a may have an opening 122b. The opening 122b may be positioned at a central portion of the flat part 122a. A size of the opening 122b may be less than a size of the flat part 122a. A first center line CL1 may be parallel to a long side of the flat part 122a, and a second center line CL2 may be parallel to a short side of the flat part 122a. The second center line CL2 may intersect the first center line CL1.

The flat part 122a may include a first region A, a second region B, a third region C, and a fourth region D. The regions A, B, C, and D may be divided by the first center line CL1 and the second center line CL2. For example, the first region A may be a first quadrant A, the second region B may be a second quadrant B, the third region C may be a third quadrant C, and the fourth region D may be a fourth quadrant D.

The rotating shaft 122c may be located in the third region C. The rotating shaft 122c may extend from the front to the rear at the flat part 122a of the third region C. The rotating shaft 122c may protrude and extend rearward from a rear surface of the flat part 122a. The rotating shaft 122c may include a first shaft 122c1 and a second shaft 122c2. The first shaft 122c1 may be fixed to the rear surface of the flat part 122a, and the second shaft 122c2 may extend from the first shaft 122c1. A diameter of the first shaft 122c1 may be greater than a diameter of the second shaft 122c2.

Referring to FIGS. 8 to 11, the driving unit 140 may include a bracket 141, a motor 146, gears 143 and 144, and a sensor (145a, 145b). The bracket 141 may be installed in or fixed to the accommodation space of the rear part 104 of the housing 10. The motor 146 may be fixed to one side of the bracket 141. The gear 144, which is a driving gear, may be fixed to a rotating shaft of the motor 146. The motor 146 may cause the driving gear 144 to rotate.

A transmission shaft 142 may be rotatably installed at the bracket 141. The transmission shaft 142 may include a first transmission shaft 142a and a second transmission shaft 142b. The first transmission shaft 142a may rotate on the bracket 141. The second transmission shaft 142b may be fixed to the first transmission shaft 142a so as to rotate together with the first transmission shaft 142a. The gear 143, which is a transmission gear, may be coupled to the second transmission shaft 142b. The transmission gear 143 may rotate together with the transmission shaft 142. An inner diameter of the second transmission shaft 142b may be substantially equal to or slightly less than an outer diameter of the second shaft 122c2 of the rotating shaft 122c. For example, the second shaft 122c2 of the rotating shaft 122c may be press-fitted to the second transmission shaft 142b.

The transmission gear 143 may mesh with the driving gear 144. When the driving gear 144 is rotated by the motor 146, the transmission gear 143 and the transmission shaft 142 may be rotated. The rear plate 122 (see FIG. 7) may rotate as the transmission shaft 142 rotates, which allows the second display 120 (see FIG. 4) to rotate.

The transmission gear 143 may include an indicator 143a. The indicator 143a may be fixed to the transmission gear 143. For example, the indicator 143a may be a U-shaped rim and may protrude from an outer circumference of the transmission gear 143 in a radial direction of the transmission gear 143.

The sensor (145a, 145b) may detect rotation of the transmission shaft 142. A plurality of sensors 145a and 145b may be provided. A first sensor 145a may be fixed to the bracket 141 while being adjacent to the outer circumference of the transmission gear 143. A second sensor 145b may be spaced apart from the first sensor 145a, and may be fixed to the bracket 141 while being adjacent to the outer circumference of the transmission gear 143. For example, an angle between the first sensor 145a and the second sensor 145b with respect to the transmission shaft 142 may be 90 degrees.

For example, the sensor 145a, 145b may be a photoelectric sensor. The indicator 143a may have a protrusion 143b that passes through the photoelectric sensor. As the transmission gear 143 rotates, the indicator 143a may move from the first sensor 145a to the second sensor 145b. As the transmission gear 143 rotates, the indicator 143a may move from the second sensor 145b to the first sensor 145a.

A cover 147 may be fixed to the bracket 141 while covering the transmission shaft 142, the transmission gear 143, and the driving gear 144.

Referring to FIGS. 12 to 15, the second display 120 may be rotatable about a rotation axis CX. As the second display 120 rotates, the second display 120 may be shifted in the horizontal direction and the vertical direction.

The second display 120 may be rotatable about the rotation axis CX in the first mode. In the first mode, an overlapping area of the first display 110 that is covered or hidden by the second display 120 may be referred to as a first overlapping area EA1, and an overlapping area of the third display 130 that is covered or hidden by the second display 120 may be referred to as a second overlapping area EA2.

The first overlapping area EA1 and/or the second overlapping area EA2 may be activated upon rotation of the second display 120. For example, the first display 110 may extend an information display area to the first overlapping area EA1, and the third display 130 may extend an information display area to the second overlapping area EA2.

When the second display 120 is switched from the first mode to the second mode, the first overlapping area EA1 and the second overlapping area EA2 may be activated. In the second mode, the first display 110 may display more information in the extended area than in the first mode. In the second mode, the third display 130 may display more information in the extended area than in the first mode. In the second mode, the second display 120 may display information in the same area as in the first mode, but the second display 120 may change the arrangement of text or images depending on the type of information for easier recognition by a user.

Figure 16:
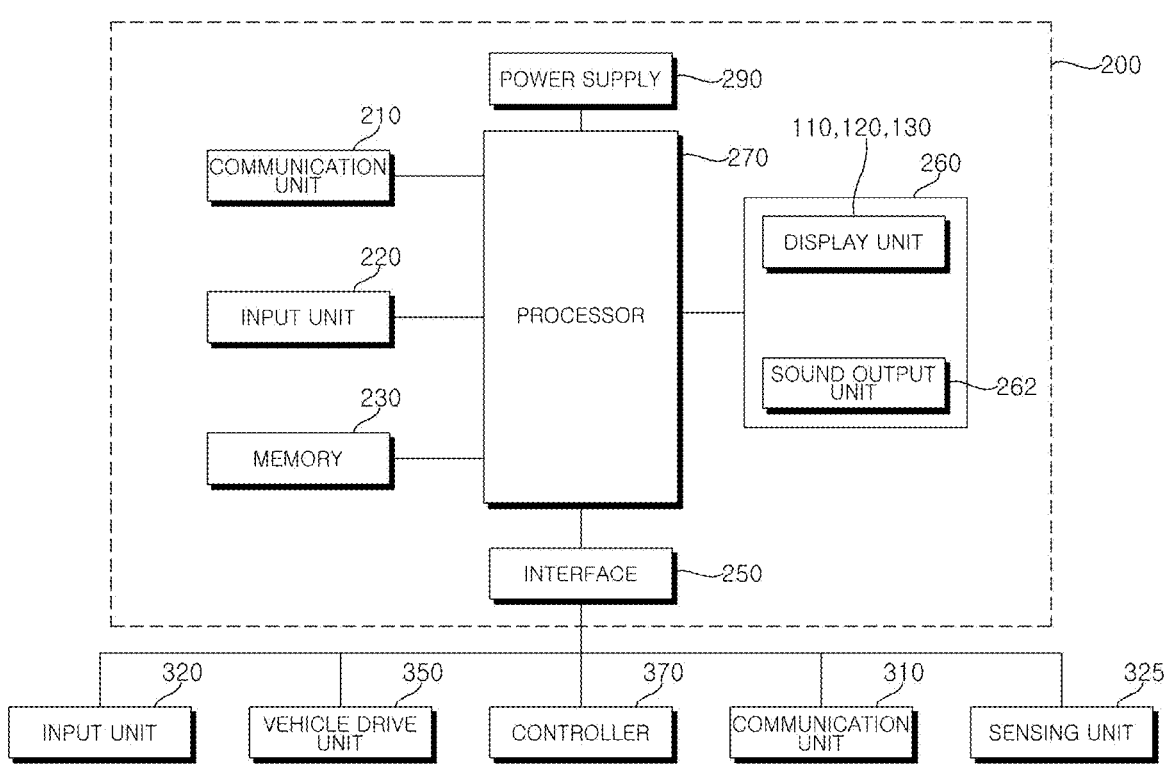

Referring to FIG. 16, a display device 200 for vehicle may include a communication unit 210, an input unit 220, a memory 230, an interface 250, an output unit 260, a processor 270, and a power supply 290. The display device 200 for vehicle may be the display device 100 for vehicle. The processor 270 may be referred to as a main controller 270 or a first controller 270.

The communication unit 210 may perform data communication with another device located inside or outside the vehicle. For example, the another device may include at least one of a terminal, a mobile terminal, a server, and another vehicle. The communication unit 210 may include at least one of a V2X communication module, an optical communication module, a location information module, and a short-range communication module.

The input unit 220 may receive various inputs to the display device 200 for vehicle. The input unit 220 may receive a user input to the display device 200 for vehicle. When an ON input to the display device 200 for vehicle is received through the input unit 220, the display device 200 for vehicle may be operated.

The input unit 220 may be electrically connected to the processor 270. The input unit 220 may generate a signal corresponding to the received input and provide the signal to the processor 270. The processor 270 may control the display device 200 for vehicle based on the input to the display device 200 for vehicle received through the input unit 220.

The input unit 220 may receive activation input for various functions of the display device 200 for vehicle. For example, the input unit 220 may receive a setting input for an output manner of the output unit 260.

The input unit 220 may include at least one of a mechanical input device, a touch input device, and a wireless input device. The mechanical input device may include a button, a lever, a jog wheel, a switch, etc. The touch input device may include at least one touch sensor. The touch input device may be configured as a touch screen.

In a state where navigation is output to the touch screen, when a touch input for a specific point of the navigation is received, the processor 270 may generate and output a travel route for the vehicle to travel to the specific point corresponding to the received touch input, or may control the vehicle to autonomously travel to the specific point. The wireless input device may receive a user input wirelessly.

The memory 230 may store a program required for the processor 270 to process or control, various data regarding the operation of the display device 200 for vehicle, and at least one content. The memory 230 may be electrically connected to the processor 270. The processor 270 may control such that various data regarding the operation of the display device 200 for vehicle is stored in the memory 230. The processor 270 may output content stored in the memory 230 to the output unit 260.

The interface 250 may serve as a channel between the display device 200 for vehicle and an external device. The interface 250 may receive various signals or information from the outside or may transmit signals or information provided by the processor 270 to the outside. The interface 250 may be connected to the processor 270, an input unit 320, a vehicle drive unit 350, a controller 370, a communication unit 310, and a sensing unit 325 to perform data communication. The controller 370 may be referred to as a sub-controller 370 or a second controller 370.

The interface 250 may transmit vehicle driving information, provided from at least one of the input unit 320, the vehicle drive unit 350, the controller 370, the communication unit 310, and the sensing unit 325, to the processor 270.

The driving information may include information on at least one of a location of the vehicle, a travel route, a speed, an autonomous driving status, a drive mode, a fuel level, a charging level, a vehicle type, a driver's status, and a time. The drive mode may include an eco mode for fuel efficient driving, a sport mode for spirited driving, and a normal mode.

The interface 250 may provide a signal provided by the processor 270 to the controller 370 or the vehicle drive unit 350. The signal provided to the controller 370 or the vehicle drive unit 350 may be a signal for controlling the vehicle. The controller 370 may control the vehicle in response to the signal for controlling the vehicle. The vehicle drive unit 350 may be operated in response to the signal for controlling the vehicle.

The output unit 260 may include a display unit 110, 120, 130 to output an image and a sound output unit 262 to output sound. The display 110, 120, 130 described above may be referred to as the display unit 110, 120, 130.

The display unit 110, 120, 130 may display various graphic objects. The display unit 110, 120, 130 may include a cluster that allows a driver to check vehicle driving information or vehicle status information. The cluster may be positioned on a dashboard. The driver may check information displayed on the cluster while staying focused on the road ahead.

The display unit 110, 120, 130 may be implemented as a head-up display (HUD). When the display unit 110, 120, 130 is implemented as the HUD, information may be output via a transparent display provided on a windshield. Alternatively, the display unit 110, 120, 130 may include a projection module to output information through an image projected onto the windshield.

The transparent display may have a predetermined degree of transparency and display a predetermined screen thereon. The transparent display may include a transparent organic light-emitting diode (OLED) to achieve transparency. The transparency of the transparent display may be adjustable.

The display unit 110, 120, 130 may be inter-layered or integrated with the touch input device included in the input unit 220 to implement a touch screen. The touch screen may function as the input unit 220 that provides an input interface between the display device 200 for vehicle and a user while providing an output interface between the display device 200 for vehicle and the user.

The display unit 110, 120, 130 may include a touch sensor for detecting a touch, so as to receive a control command in a touch manner. When a touch is made on the display unit 110, 120, 130, the touch sensor may detect the touch, and the processor 270 may generate, based on the detected touch, a control command corresponding to the touch. The content input in a touch manner may be characters or numbers, instructions in various modes, or menu items that can be designated.

The display unit 110, 120, 130 may be electrically connected to the processor 270 so as to be controlled by the processor 270. The processor 270 may output an image of the content or a navigation screen through the display unit 110, 120, 130. The navigation, which is an application program for guiding a travel route of the vehicle, may include a screen showing the travel route or voice guidance.

The sound output unit 262 may output sound corresponding to an electrical signal provided by the processor 270. For this purpose, the sound output unit 262 may include a speaker or the like. The processor 270 may output sound of the content or voice guidance of the navigation through the sound output unit 262.

The processor 270 may control the overall operation of each unit in the display device 200 for vehicle. The processor 270 may be electrically connected to the communication unit 210, the input unit 220, the memory 230, the interface 250, the power supply 290, and the output unit 260.

Referring to FIGS. 1 to 16, a display device for a vehicle may include: a housing 10 that defines an accommodation space therein; a first display 110 fixed to an outside of the housing 10; a second display 120 that is positioned adjacent to the first display 110 at the outside of the housing 10 and rotatably coupled to the housing 10; and a driving module 140 that is installed in the accommodation space of the housing 10 and connected to the second display 120 to cause the second display 120 to rotate. A portion of the second display 120 may overlap the first display 110 as the second display 120 rotates.

The second display 120 may include: a display panel 121; a rear plate 122 positioned at a rear of the display panel 121 and to which the display panel 121 is coupled; and a rotating shaft 122c disposed opposite the display panel 121 with respect to the rear plate 122 and protruding from a rear surface of the rear plate 122, the rotating shaft 122c being configured to receive a rotational force from the driving module 140. The rear plate 122 may correspond to a shape of the display panel 121, and may have a first center line CL1 and a second center line CL2 that intersect each other at a point where a center of the display panel is located. The rotating shaft 122c may be positioned adjacent to the point of intersection.

The display device may further include a controller 270 that is electrically connected to the first display 110 and the second display 120 and configured to control an image displayed on each of the first display 110 and the second display 120. The controller 270 may be configured to activate an overlapping area EA1 of the first display 110 that is exposed to an outside as the second display 120 rotates.

The controller 270 may configured to deactivate an overlapping area EA1 where the second display 120 overlaps the first display 110 as the second display 120 rotates.

The driving module 140 may include: a transmission shaft 142 connected to the rotating shaft of the second display 120; a transmission gear 143 fixed to the transmission shaft 142; a driving gear 144 configured to mesh with the transmission gear 143; and a motor 146 to cause the driving gear 144 to rotate.

The driving module 140 may further include: an indicator 143a protruding from an outer circumference of the transmission gear 143 in a radial direction of the transmission gear 143; and a sensor 145 positioned adjacent to the transmission gear 143 and configured to detect movement of the indicator 143a.

The sensor 145 may include: a first sensor 145a configured to detect the movement of the indicator 143a; and a second sensor 145b spaced apart from the first sensor 145a in a circumferential direction of the transmission gear 143, the second sensor 145*b* being configured to detect the movement of the indicator 143*a*.

The first sensor 145*a* and the second sensor 145*b* may be at 90 degrees with respect to the transmission shaft 142.

The display device may further include a controller 270 electrically connected to the first display 110, the second display 120, the first sensor 145*a*, and the second sensor 145*b*, the controller 270 being configured to control an image displayed on each of the first display 110 and the second display 120. The controller 270 may be configured to: based on information obtained from the first sensor 145*a*, activate an overlapping area EA1 where the first display 110 and the second display 120 overlap each other to extend a display area of the image; and based on information obtained from the second sensor 145*b*, stop extending the display area of the overlapping area EA1.

The display device may further include: a controller 270 electrically connected to the first display 110, the second display 120, the first sensor 145*a*, and the second sensor 145*b*, the controller 270 being configured to control an image displayed on each of the first display 110 and the second display 120. The controller 270 may be configured to: based on information obtained from the second sensor 145*b*, deactivate an overlapping area EA1 where the first display 110 and the second display 120 overlap each other to reduce a display area of the image; and based on information obtained from the first sensor 145*a*, stop reducing the display area of the overlapping area EA1.

The controller 270 may be configured to, in response to rotation of the second display 120, rearrange the image displayed on the second display 120.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A display device for a vehicle, the display device comprising:
a housing;
a first display fixed to an outside of the housing;
a second display positioned adjacent to the first display at the outside of the housing, the second display being rotatably coupled to the housing; and
a driving module installed in the housing, the driving module being connected to the second display to rotate the second display,
wherein a portion of the second display overlaps the first display in each of a landscape mode and a portrait mode of the second display,
wherein the second display comprises:
a display panel;

a rear plate positioned at a rear of the display panel and to which the display panel is coupled; and
a rotating shaft disposed opposite the display panel with respect to the rear plate and protruding from a rear surface of the rear plate, the rotating shaft being configured to receive a rotational force from the driving module,
wherein the rear plate corresponds to a shape of the display panel, and has a first center line and a second center line that intersect each other at a point where a center of the display panel is located,
wherein the rotating shaft is positioned offset from the point,
wherein the driving module comprises:
a transmission shaft connected to the rotating shaft of the second display;
a transmission gear fixed to the transmission shaft;
an indicator protruding from an outer circumference of the transmission gear in a radial direction of the transmission gear; and
a sensor positioned adjacent to the transmission gear and configured to detect movement of the indicator, and
wherein the sensor comprises:
a first sensor configured to detect the movement of the indicator; and
a second sensor spaced apart from the first sensor in a circumferential direction of the transmission gear, the second sensor being configured to detect the movement of the indicator.

2. The display device of claim 1, further comprising a controller electrically connected to the first display and the second display, the controller being configured to control an image displayed on each of the first display and the second display,
wherein the controller is configured to activate an overlapping area of the first display that is exposed to an outside as the second display rotates.

3. The display device of claim 2, wherein the controller is configured to deactivate an overlapping area where the second display overlaps the first display as the second display rotates.

4. The display device of claim 1, wherein the driving module further comprises:
a driving gear configured to mesh with the transmission gear; and
a motor to cause the driving gear to rotate.

5. The display device of claim 1, wherein the first sensor and the second sensor are at 90 degrees with respect to the transmission shaft.

6. The display device of claim 1, further comprising a controller electrically connected to the first display, the second display, the first sensor, and the second sensor, the controller being configured to control an image displayed on each of the first display and the second display,
wherein the controller is configured to:
based on information obtained from the first sensor, activate an overlapping area where the first display and the second display overlap each other to extend a display area of the image; and
based on information obtained from the second sensor, stop extending the display area of the overlapping area.

7. The display device of claim 1, further comprising a controller electrically connected to the first display, the second display, the first sensor, and the second sensor, the controller being configured to control an image displayed on each of the first display and the second display, wherein the controller is configured to:

based on information obtained from the second sensor, deactivate an overlapping area where the first display and the second display overlap each other to reduce a display area of the image; and based on information obtained from the first sensor, stop reducing the display area of the overlapping area.

8. The display device of claim 6, wherein the controller is configured to, in response to rotation of the second display, rearrange the image displayed on the second display.

* * * * *